United States Patent
Mohr et al.

(10) Patent No.: US 9,605,564 B2
(45) Date of Patent: Mar. 28, 2017

(54) METHOD FOR OPERATING A POWER PLANT

(71) Applicant: ALSTOM Technology Ltd, Baden (CH)

(72) Inventors: Wolfgang Franz Dietrich Mohr, Niederweningen (CH); Hamid Olia, Zurich (CH); Miguel Angel Carrillo Rubio, Chatham Kent (GB); Juergen Reinhard, Kuessaberg (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 367 days.

(21) Appl. No.: 14/488,344

(22) Filed: Sep. 17, 2014

(65) Prior Publication Data

US 2015/0000279 A1 Jan. 1, 2015

Related U.S. Application Data

(63) Continuation of application No. PCT/EP2013/055589, filed on Mar. 18, 2013.

(30) Foreign Application Priority Data

Mar. 19, 2012 (EP) ..................... 12160093

(51) Int. Cl.
*F01K 13/02* (2006.01)
*F01D 21/00* (2006.01)
(Continued)

(52) U.S. Cl.
CPC ............ *F01K 13/02* (2013.01); *F01D 19/00* (2013.01); *F01D 21/00* (2013.01); *F01K 9/003* (2013.01); *F01K 9/023* (2013.01); *F01K 23/10* (2013.01)

(58) Field of Classification Search
CPC .......... F01K 13/02; F01K 23/10; F01K 9/003; F01K 9/023; F01D 21/00; F01D 19/00
(Continued)

(56) References Cited

U.S. PATENT DOCUMENTS 4,391,101 A * 7/1983 Labbe ................ B01D 19/0047
60/646
4,455,614 A * 6/1984 Martz ..................... F01K 23/10
290/40 R (Continued)

FOREIGN PATENT DOCUMENTS

CN 101503976 A 8/2009
CN 201367921 Y 12/2009
(Continued)

*Primary Examiner* — Hoang Nguyen
(74) *Attorney, Agent, or Firm* — GE Global Patent Operation; Marc A. Vivenzio

(57) ABSTRACT

The invention relates to a method for operating a steam power plant, particularly a combined cycle power plant, which includes a gas turbine an a steam/water cycle with a heat recovery steam generator, through which the exhaust gases of the gas turbine flow, a water-cooled condenser, a feedwater pump and a steam turbine. A cooling water pump is provided for pumping cooling water through said water-cooled condenser. Evacuating means are connected to the water-cooled condenser for evacuating at least said water-cooled condenser. The method relates to a shut down and start-up of the power plant after the shutdown. The method includes:
  a) shut down of the steam turbine and gas turbine and/or a combustor of said gas turbine ;
  b) restoration of a good vacuum within the condenser by using said evacuating means;
  c) stopping said cooling water pump of said water-cooled condenser and said evacuating means, and filling up at least said condenser with steam up to slightly above atmospheric pressure;

(Continued)

d) controlling the pressure with a flow of said cooling water;
e) after a certain shut-down period starting the cooling water pump just before start-up of the plant; and
f) starting the plant.

11 Claims, 3 Drawing Sheets

(51) Int. Cl.
  *F01D 19/00* (2006.01)
  *F01K 23/10* (2006.01)
  *F01K 9/02* (2006.01)
  *F01K 9/00* (2006.01)

(58) Field of Classification Search
  USPC .......... 60/646, 657, 653, 677–679, 690, 692
  See application file for complete search history.

(56) References Cited

U.S. PATENT DOCUMENTS

| | | | |
|---|---|---|---|
| 5,095,706 A | 3/1992 | Saito et al. | |
| 5,921,085 A | 7/1999 | Kawano | |
| 2001/0008066 A1* | 7/2001 | Liebig | F01K 23/10 60/772 |
| 2013/0300121 A1* | 11/2013 | Ali | F23G 5/0276 290/52 |

FOREIGN PATENT DOCUMENTS

| | | |
|---|---|---|
| CN | 101900494 A | 12/2010 |
| JP | H02-36761 A | 2/1990 |
| WO | 01/59265 A1 | 8/2001 |

* cited by examiner

METHOD FOR OPERATING A POWER PLANT

CROSS-REFERENCE TO RELATED APPLICATIONS

This application claims priority to PCT/EP2013/055589 filed Mar. 18, 2013, which claims priority to European application 12160093.6 filed Mar. 19, 2012, both of which are hereby incorporated in their entireties.

TECHNICAL FIELD

The present invention relates to the technology of steam power plants or combined cycle power plants. It refers to a method for operating a steam power plant or a combined cycle power plant according to the preambles of claims 1 and 2.

BACKGROUND

As is explained in document U.S. Pat. No. 5,095,706, a combined cycle power plant has been highly evaluated as a power generating system which assures that two excellent properties, i.e., a facility of load change and a high thermal efficiency can be achieved. To rise up a level of the excellent properties as mentioned above, research and development works have been conducted, so as to improve a method of operating a power plant and apparatuses and instruments associated with the foregoing method. The latest remarkable activity with respect to the method of operating a power plant is a shift from a base load operation to a daily start and stop operation (hereinafter referred to simply as a DSS operation).

During the shutdown of the steam turbine plant, a large quantity of condensate is stored in the hot well in the condenser in preparation of next start-up operation of the steam turbine plant. However, since atmospheric air intentionally by the vacuum breakers and unavoidably by leakages enters into the interior of the condenser during the shutdown of the steam turbine plant, a long period of waiting time elapses until operation of the steam turbine plant is started, as the condensate is brought in contact with the atmospheric air. For this reason, a large quantity of oxygen and $CO_2$ becomes dissolved in the condensate with the result that the dissolved oxygen concentration varies to a very high value in excess of a preset value of 7 ppb, which should be maintained during operation of the steam turbine plant. For example, provided that no measure is taken not only to prevent an atmospheric air from penetrating the condenser but also to prevent oxygen in the atmospheric air from being dissolved in the condensate, a value of the dissolved oxygen concentration is raised up to a high value of 10000 ppb and the pH-value is increased.

Provided that the dissolved oxygen concentration which has been raised up to a level of 10000 ppb should be lowered to 80 ppb with the aid of the condensate recirculation system (numeral 160 in FIG. 7 of the U.S. Pat. No. 5,095,706), a long time is required to deaerate the condensate. Thus, there is a possibility that a time consumed for deaerating at every time of DSS operation is elongated and the steam turbine plant fails to quickly meet the requirement from the electricity consumers' side.

To solve this problem, the U.S. Pat. No. 5,095,706 provides a start-up method of a steam turbine plant including a condenser wherein a tube bundle for condensing an exhaust steam from a steam turbine and a hot well for storing a condensate therein are arranged in the interior of a condenser shell, wherein the interior of the condenser shell is air tightly divided into two parts with a partition plate there between, one of them being an upper space containing the tube bundle and the other one being a lower space containing the hot well; at least one connecting pipe extends between the upper space and the lower space, the connecting pipe being provided with an isolation valve to isolate the both spaced at the position there between; at the shut-down of steam turbine plant, the isolation valve on the connecting pipe is closed to isolate the lower space from the upper space and to maintain the lower space in vacuum and; at the start-up of the steam turbine plant, the isolation valve on the connecting pipe is opened after the upper chamber is evacuated, whereby the upper space is communicated with the lower space which has been maintained in vacuum.

Another way to establish the necessary vacuum in the condenser prior to opening of the steam turbine bypasses and prior to start up the steam turbine is done with evacuation pumps (normally steam ejectors or water ring pumps). Such a solution is for example disclosed in document WO 01/59265 A1.

However, these known operating methods are still time and energy consuming.

SUMMARY

It is an object of the present invention to provide an operating method, which allows to save energy during shut-down and at the same time accelerates the restart of the plant.

This object is obtained by a method for operating a steam power plant according to claim 1.

The method is applied to a steam power plant, which comprises at least a steam generator, a steam turbine and a steam/water cycle, at least consisting of a water-cooled condenser, a deaerator and a feedwater pump, whereby a cooling water pump is provided for pumping cooling water through said water-cooled condenser, and evacuating means are connected to said water-cooled condenser for evacuating at least said water-cooled condenser, said operating method being related to a shut down and start-up of said power plant after said shut down and comprising the steps of:
 a) shut down of the steam turbine;
 b) restoration of a good vacuum within the condenser by using said evacuating means;
 c) stopping said cooling water pump of said water-cooled condenser and said evacuating means, and filling up at least said condenser with steam up to slightly above atmospheric pressure;
 d) controlling the pressure with a flow of said cooling water;
 e) after a certain shut-down period starting the cooling water pump just before start-up of the plant;
 f) starting the plant.

According to a first embodiment of the invention the steam power plant is a combined cycle power plant, comprising at least a gas turbine and a steam/water cycle with a heat recovery steam generator, through which the exhaust gases of the gas turbine flow, a water-cooled condenser, a feedwater pump and a steam turbine, whereby a cooling water pump is provided for pumping cooling water through said water-cooled condenser, and evacuating means are connected to said water-cooled condenser for evacuating at least said water-cooled condenser.

According to another embodiment of the invention the steam turbine comprises a low-pressure steam turbine, and the condenser and said low-pressure steam turbine are filled up with steam in step (c).

According to another embodiment of the invention the steam for filling up said condenser is taken from the steam/water cycle.

Especially, the steam turbine has a steam-sealed gland, and gland steam is used for filling up said condenser.

Alternatively, the steam turbine has a low-pressure steam turbine with a steam bypass, and the steam for filling up said condenser is taken from the LP steam bypass.

According to another embodiment of the invention the condenser as well as other components with heat loss, such as bypass lines etc. have an insulation.

In addition, the built up inversion layer on the hot well is passively used to avoid excessive heat loss during the filling of the condenser.

According to another advantageous embodiment of the invention the ejector is started at startup procedure as soon as possible to extract the gases diffused into the steam before they go into solution with the condensed water.

BRIEF DESCRIPTION OF THE DRAWINGS

The present invention is now to be explained more closely by means of different embodiments and with reference to the attached drawings.

DETAILED DESCRIPTION

Figure 1:
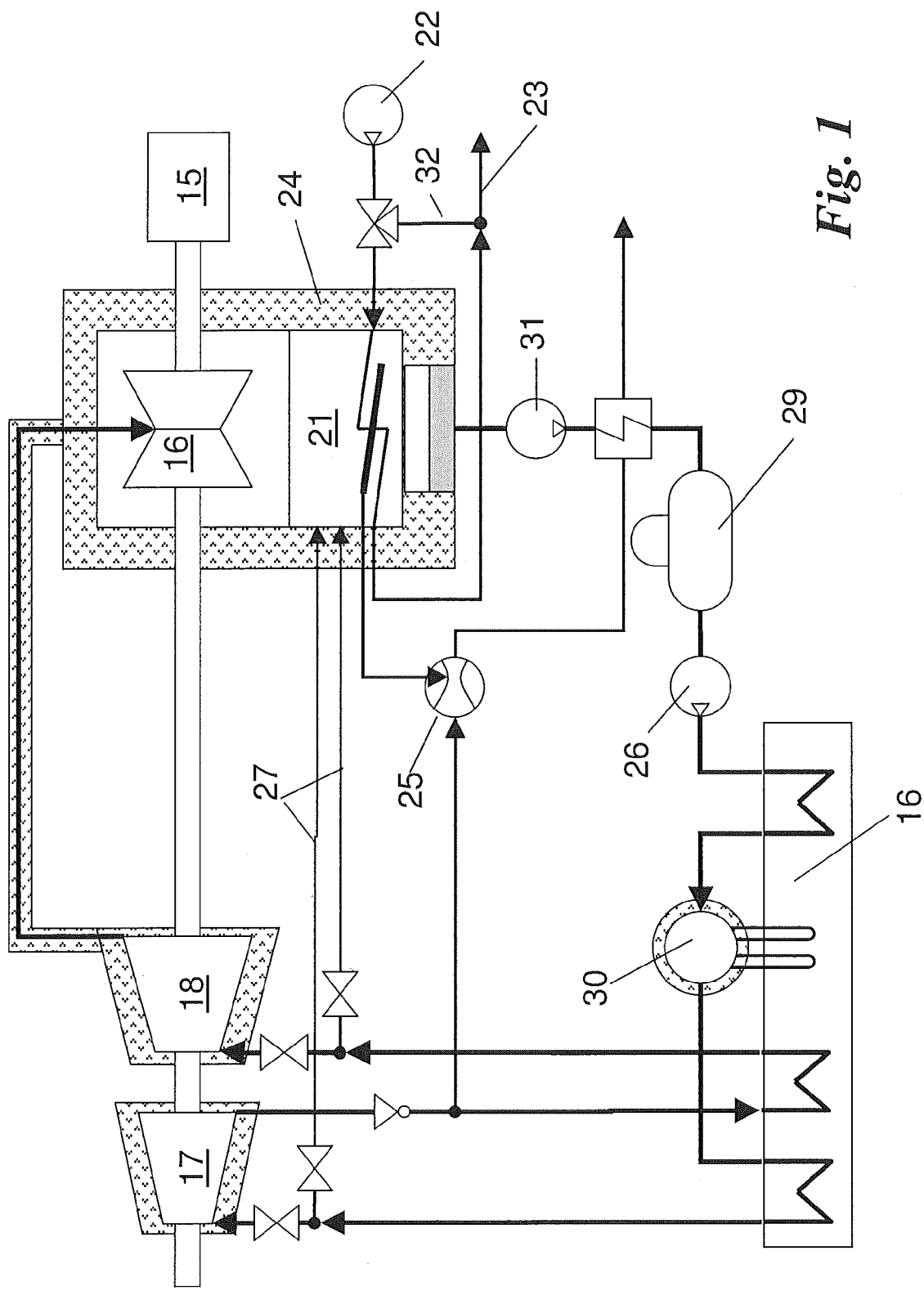
FIG. 1 shows a simplified schematic diagram of a steam power plant, which can be used to practice the inventive operating method.

FIG. 1 shows a simplified schematic diagram of a steam power plant, which can be used to practice the inventive operating method. The steam power plant of FIG. 1 comprises a steam turbine 17, 18, 19, a steam generator 16, a steam/water cycle 20 and an electric generator 15, driven by the steam turbine 17, 18, 19.

Hot combustion gases of a fossil fuel flow through the steam generator 16 and deliver the energy for generating the steam. The steam drives a steam turbine comprising a high-pressure steam turbine 17, an intermediate-pressure steam turbine 18 and a low-pressure steam turbine 19.

The steam exiting the low-pressure steam turbine 19 is condensed to water in a water-cooled condenser 21 and then pumped as feedwater back to the steam generator 16 by means of a feedwater pump 26. The condenser 21 is part of a cooling water circuit 23 containing the cooling water pump 22. The condenser 21 and other heat loosing components can have an insulation 24. The condenser 21 can be evacuated by means of evacuation pump 25. Furthermore, steam filling lines 27 may be provided to fill the condenser 21 with steam from a steam source within the steam/water cycle 20, in the example of FIG. 1 with steam sources situated at the high-pressure steam turbine 17 and intermediate-pressure steam turbine 18.

After a shut-down of the steam turbine 17, 18, 19 at first a good vacuum has to be restored in the condenser 21 by means of the evacuation pump 25.

Then, the condenser 21 and the low-pressure steam turbine 19 will be filled with steam from vacuum up to slightly above atmospheric pressure (approx. 1 bar) in a short time. This is to avoid any air leakage into the condenser 21 as soon as the evacuation pump 25 and cooling water pump 22 are shut down. The pressure is controlled with a flow of said cooling water. For this purpose a condenser bypass line 32 with a bypass valve 33 is installed in the cooling water circuit 23.

Next, for restoration of vacuum before start up of the plant, the cooling water pump 22 will come into operation again and will establish full vacuum within the condenser 21 in a very short time.

Finally, the plant can be started up.

The steam source to heat up and fill the condenser 21 with steam may be the gland steam of a steam-sealed gland or the LP steam bypass system (not shown in the figure). Further steam sources to establish the 1 bar conditions in the condenser 21 for the overnight shut down could be high-pressure (HP), intermediate pressure (IP) process steam, auxiliary steam or boiler, etc. To lower the steam consumption the condenser 21 with condenser neck and the other heat loosing components could be insulated by means of an insulation 24.

Figure 2:
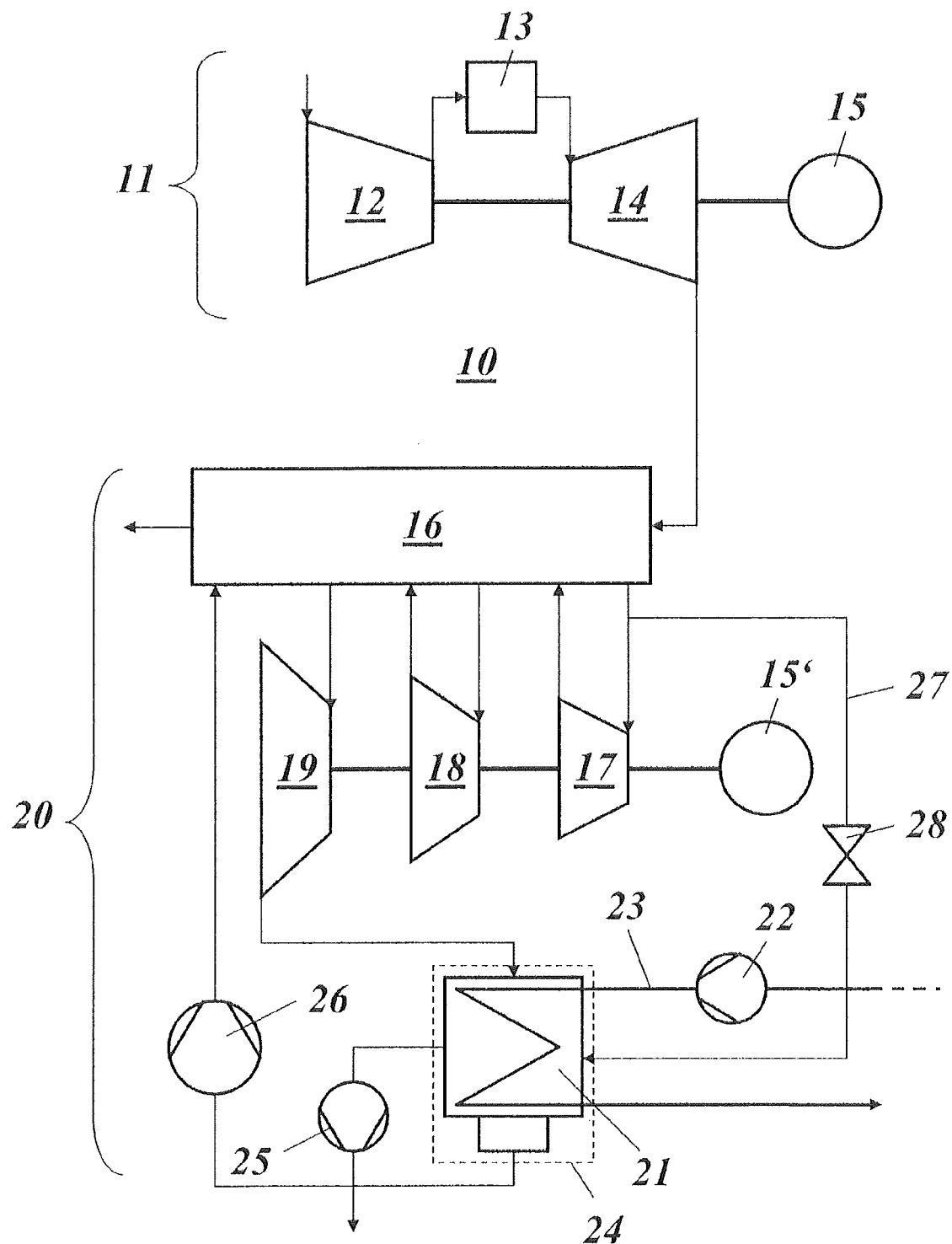
FIG. 2 shows a schematic diagram of a combined cycle power plant, which can be used to practice the inventive operating method.
Figure 3:
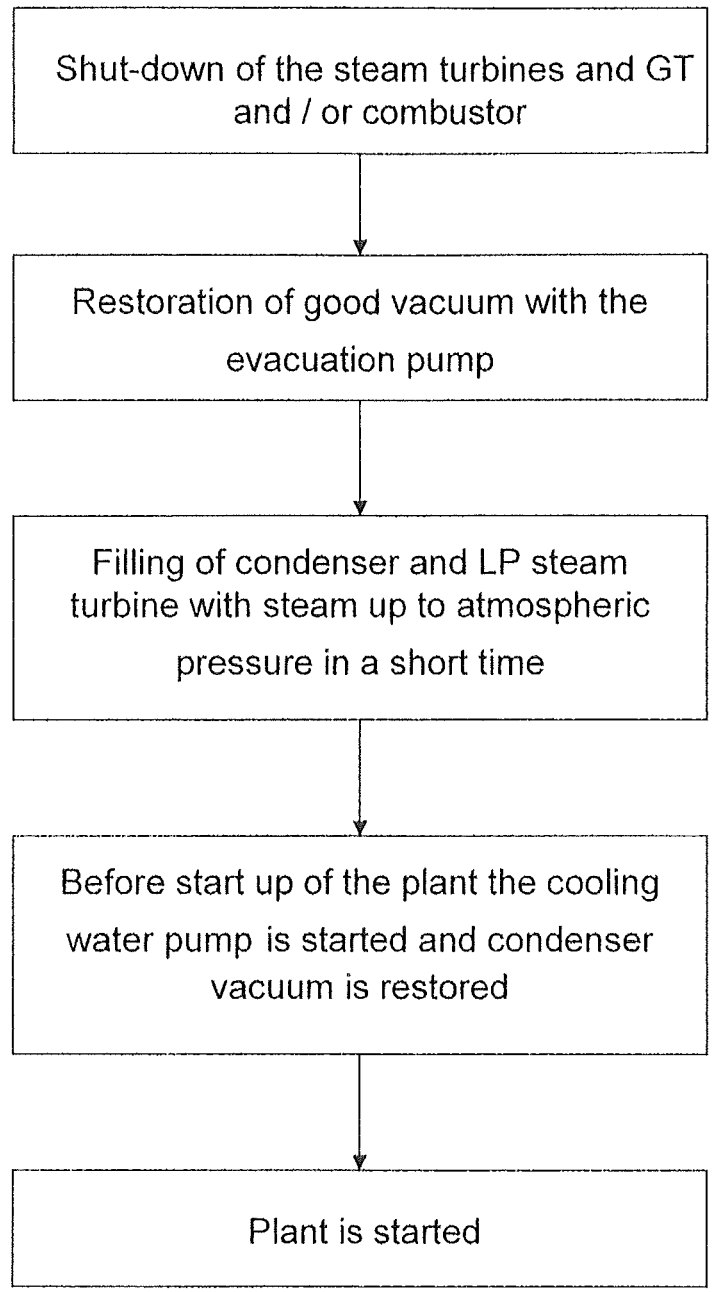
FIG. 3 shows various steps of a method according to an embodiment of the invention.

FIG. 2 shows schematically a diagram of a combined cycle power plant, which can be used to practice the inventive operating method. The combined cycle power plant 10 of FIG. 2 comprises a gas turbine 11 and a steam/water cycle 20, which are interconnected by using a heat recovery steam generator 16. The gas turbine 11 comprises a compressor 12, a combustor 13 and a turbine 14. The gas turbine 11 drives a first generator 15.

The hot exhaust gases from the gas turbine 11 flow through the heat recovery steam generator 16, which is part of this steam/water cycle 20. Within the heat recovery steam generator 16 steam is generated, which drives a steam turbine comprising a high-pressure steam turbine 17, an intermediate-pressure steam turbine 18 and a low-pressure steam turbine 19. The steam turbine 17, 18, 19 drives a second electric generator 15'.

The steam exiting the low-pressure steam turbine 19 is condensed to water in a water-cooled condenser 21 and then pumped as feedwater back to the heat recovery steam generator 16 by means of a feedwater pump 26. The condenser 21 is part of the cooling water circuit 23 containing the cooling water pump 22. The condenser 21 can have an insulation 24 (dashed line in FIG. 2). The condenser 21 can be evacuated by means of vacuum pump 25. Furthermore, steam filling line 27 with a steam filling valve 28 may be provided to fill the condenser 21 with steam from a steam source within the steam/water cycle 20. In the example of FIG. 1 with a steam source is situated at the high-pressure steam turbine 17.

Now, after a shut-down of the steam turbine 17, 18, 19 and gas turbine 11 and/or combustor 13 (where usually vacuum is fully or partial broken), at first a good vacuum has to be restored in the condenser 21 by means of the evacuation pump 25.

Then, the condenser 21 and the low-pressure steam turbine 19 will be filled with steam from vacuum up to slightly above atmospheric pressure (approx. 1 bar) in a short time. This is to avoid any air leakage into the condenser 21 as soon as the evacuation pump 25 and cooling water pump 22 are shut down. The pressure is controlled with a flow of said cooling water.

Next, for restoration of vacuum before start up of the plant 10, the cooling water pump 22 will come into operation again and will establish full vacuum within the condenser 21 in a very short time.

Finally, the plant 10 can be started up.

The steam source to heat up and fill the condenser 21 with steam may be the gland steam of a steam-sealed gland or the LP steam bypass system. Further steam sources to establish the 1 bar conditions in the condenser 21 for the overnight shut down could be high-pressure (HP), intermediate pressure (IP) process steam, auxiliary steam or boiler, etc. To lower the steam consumption the condenser 21 with condenser neck and the other heat loosing components could be insulated by means of an insulation 24.

In comparison to other methods to keep a good vacuum available for a quick warm or hot start of the plant 10 the auxiliary power for running pumps during the overnight shut down is saved.

The invention thus has the following advantages:

No auxiliary consumption for pumps or heaters during stand-still; only an insulation 24 of the condenser 21 may be necessary.

No air ingress during stand-still:
   avoids $O_2$ and $CO_2$ peaks in the condensate during start-up;
   less stand-still corrosion in the LP system and condenser, i.e. less iron content in the condensate;

The use of LP steam for the initial condenser heat-up would advantageously take credit of the heat excess available in the cold part of the HRSG (helps to avoid blowing safety valves in the LP-Drum).

The Quick Vacuum Restoration according to the invention can be for water-cooled steam turbine condensers.

The Quick Vacuum Restoration according to the invention is a measure to shorten the start up time of the plant. This is an important market request for power plants with an over night shut down and daily start up of the plant.

The invention claimed is:

1. A method for operating a steam power plant, comprising a steam generator, a steam turbine and a steam/water cycle, at least consisting of a water-cooled condenser, a deaerator and a feedwater pump, whereby a cooling water pump is provided for pumping cooling water through said water-cooled condenser, and evacuating means are connected to said water-cooled condenser for evacuating at least said water-cooled condenser, said operating method being related to a shut down and start-up of said power plant after said shut down and comprising the steps of:
   a) shut down of the steam turbine;
   b) restoration of a good vacuum within the condenser by using said evacuating means;
   c) stopping said cooling water pump of said water-cooled condenser and said evacuating means, and filling up the vacuum portion of the steam/water cycle, at least said condenser, with steam up to slightly above atmospheric pressure;
   d) controlling the pressure with a flow of said cooling water;
   e) after a certain shut-down period starting the cooling water pump just before start-up of the plant; and
   f) starting the plant.

2. A method for operating a combined cycle power plant, comprising a gas turbine and a steam/water cycle with a heat recovery steam generator, through which the exhaust gases of the gas turbine flow, a water-cooled condenser, a feedwater pump and a steam turbine, whereby a cooling water pump is provided for pumping cooling water through said water-cooled condenser, and evacuating means are connected to said water-cooled condenser for evacuating at least said water-cooled condenser, said operating method being related to a shut down and start-up of said power plant after said shut down and comprising the steps of:
   a) shut down of the steam turbine and gas turbine and/or a combustor of said gas turbine ;
   b) restoration of a good vacuum within the condenser by using said evacuating means;
   c) stopping said cooling water pump of said water-cooled condenser and said evacuating means, and filling up the vacuum portion of the steam/water cycle, at least said condenser, with steam up to slightly above atmospheric pressure;
   d) controlling the pressure with a flow of said cooling water;
   e) after a certain shut-down period starting the cooling water pump just before start-up of the plant; and
   f) starting the plant.

3. The method according to claim 1, wherein the steam turbine comprises a low-pressure steam turbine, and the condenser and said low-pressure steam turbine are filled up with steam in step (c).

4. The method according to claim 1, wherein the steam for filling up said condenser is taken from the steam/water cycle.

5. The method according to claim 4, wherein the steam turbine has a steam-sealed gland, and gland steam is used for filling up said condenser.

6. The method according to claim 4, wherein the steam turbine has a low-pressure steam turbine with a steam bypass, and the steam for filling up the vacuum portion of the steam/water cycle, at least said condenser, is taken from the LP steam bypass.

7. The method according to claim 4, wherein the steam turbine has a low-pressure steam turbine with an auxiliary LP drum, and the steam for filling up the vacuum portion of the steam/water cycle, at least said condenser, is taken from the LP steam bypass.

8. The method according to claim 1, wherein at least the condenser has an insulation.

9. The method according to claim 1, further comprising a condenser bypass is used to control the pressure in the condenser.

10. The method according to claim 1, wherein the built up inversion layer on the hot well is used to avoid heat loss.

11. The method according to claim 1, wherein the ejector is started as soon as possible at startup procedure to extract the gases diffused into the steam.

* * * * *